Feb. 24, 1942. J. H. JACKSON 2,274,547
INSECT TRAP
Filed Jan. 30, 1941  2 Sheets-Sheet 1

Inventor
Joseph H. Jackson
By Lacy & Lacy,
Attorneys

Feb. 24, 1942.  J. H. JACKSON  2,274,547
INSECT TRAP
Filed Jan. 30, 1941  2 Sheets-Sheet 2
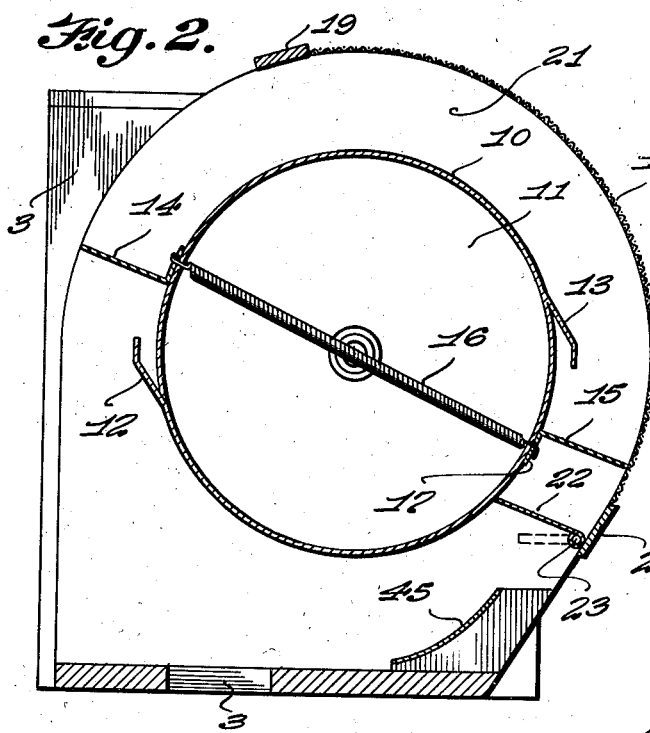
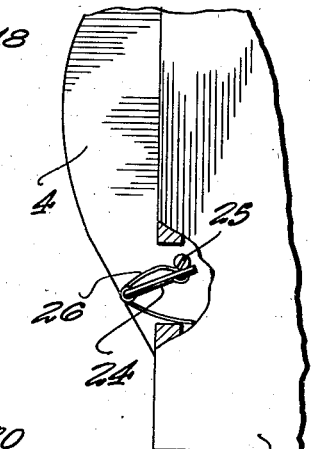
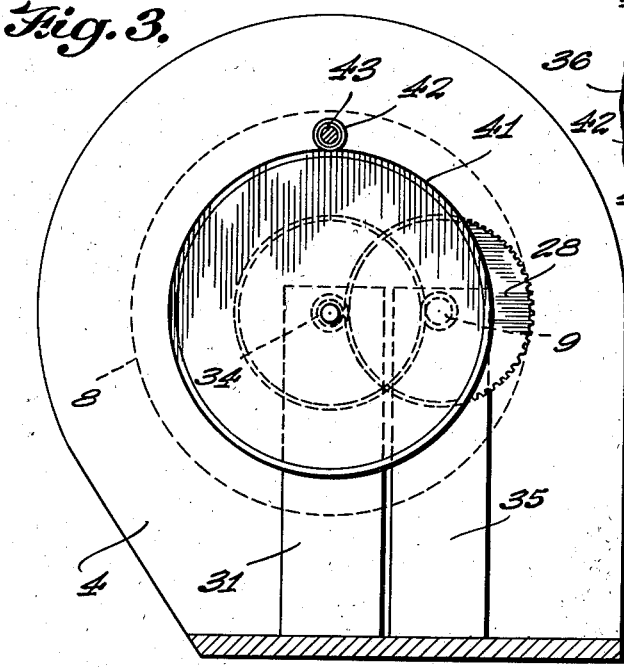
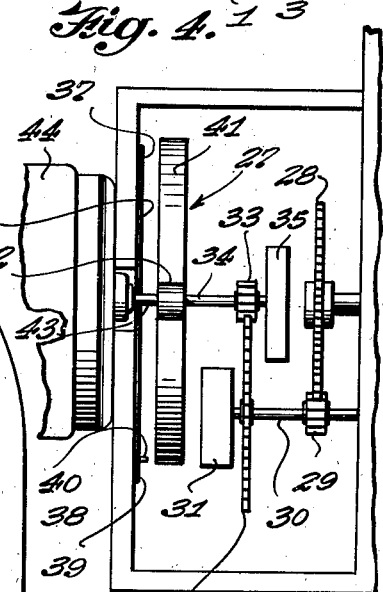
Inventor
Joseph H. Jackson
By Lacey & Lacey
Attorneys Patented Feb. 24, 1942

2,274,547

UNITED STATES PATENT OFFICE 2,274,547

INSECT TRAP

Joseph H. Jackson, Clanton, Ala.

Application January 30, 1941, Serial No. 376,691

4 Claims. (Cl. 43—111)

This invention relates to an improved insect trap and more particularly to a trap of the character for the purpose of destroying flies, roaches, ants and other insects.

One object of the invention is to provide an insect trap which will be operative for effectively destroying insects.

Another object of the invention is to provide a device of this character which will be capable of continuous operation for assuring destruction of insects at any and all times.

A further object of the invention is to provide a trap of this character which is of simple construction and which will be highly efficient in use.

And still another object of the invention is to provide an insect trap which will be operative for crushing insects so that danger of recovery of such insects will be obviated.

And another object of the invention is to provide an insect trap which may be maintained in operation over a long period of time at small cost.

Other objects of the invention, not mentioned hereinbefore, will become apparent during the course of the following description.

In the drawings forming a part of my application:

Figure 2 is a transverse vertical sectional view,

Figure 3 is a transverse sectional view taken through the transmission employed, Figure 4 is an enlarged detail top plan view of the transmission, and Figure 5 is a detail sectional view, partly in elevation, particularly showing the mounting of one end of the stationary crusher element employed.

Figure 1:
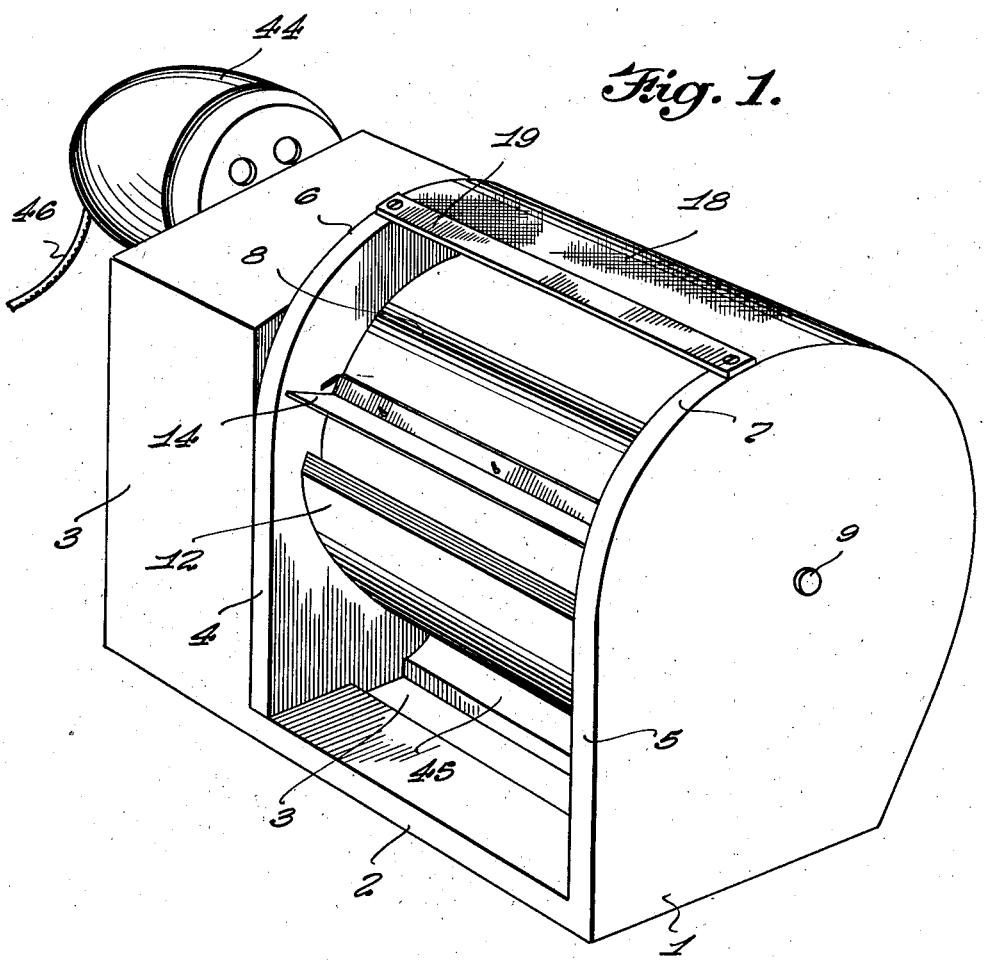
Figure 1 is a perspective view of my improved insect trap.

Referring now to the drawings, wherein like numerals of reference will be seen to designate similar parts throughout the views, the numeral 1 indicates in general the frame of my improved insect trap. The frame 1 includes a base 2 which supports a transmission housing 3 at one end. The base 2 is formed with a medially disposed longitudinally extending discharge slot 3. Rising from the base 2 are end walls 4 and 5, the end wall 4 being disposed adjacent the housing 3 and projecting slightly thereabove, and the wall 5 rising from the opposite end of the base in parallel relation with said wall 4. As shown, the end walls 4 and 5 are formed with curved upper and rear surfaces 6 and 7.

Attention is called to the fact that the frame 1 of my improved insect trap may be made of wood, metal, or other suitable light weight material.

Rotatably mounted between the end walls 4 and 5 is a drum 8, said drum being, as best seen in Figure 2, of hollow construction and being formed of suitable light weight sheet metal. The drum 8 includes a shaft 9 which has one end journaled in the end wall 5 and the other journaled in the end wall 4, said other end, however, extending into the housing 3.

The drum 8 is formed with a circular wall 10 and end walls 11. Extending substantially tangentially from the surface of the wall 10 are sheet metal buffer elements 12 and 13, the purpose of which will be set forth in more detail hereinafter. The buffer elements are disposed at substantially diametrical points on the drum and extend in the same circumferential direction.

Mounted on the drum 8 and extending longitudinally thereof throughout substantially the entire length of said drum are crusher elements 14 and 15. The crusher elements are each of substantially L-shape and are resiliently connected to the wall 10 of the drum 8 by means of a coiled spring 16 which extends diametrically through the drum and has its ends extending through the wall 10 and into the relatively short bottom legs 17 of the crusher elements. As will be clearly seen in Figure 2, the crusher elements 14 and 15 are diametrically oppositely disposed on the drum, and one of said crusher elements is disposed in spaced relation to the raised end portion of each of the buffer elements 12 and 13.

Mounted on the frame 1 is an arcuate screen 18, said screen being mounted on the curved portions 6 and 7, respectively, of the end walls 4 and 5 and extending between said walls. The screen 18 is held in place by means of strips 19 and 20 which have their opposite ends screwed or otherwise suitably secured to the surfaces 6 and 7 of said walls 4 and 5. Inasmuch as the drum 8 is of less radius than the curved part of the walls 4 and 5, a passage between the wall 10 of the drum and the screen 18 will be defined, said passage being indicated for convenience at 21.

Mounted on the frame 1 between the walls 4 and 5 and at the lower end of the passage 21 is a stationary crusher element 22, said crusher element 22 being hingedly mounted on a rod 23 which extends between the walls 4 and 5 and, as best seen in Figure 5, terminates in a laterally turned finger 24, said finger being normally held against a stop post 25 by means of a spring 26. In other words, the spring 26 will act upon the finger 24 for retaining the stationary crusher element 22 in the position shown in Figure 2 under normal conditions. As shown, when in normal position, the stationary crusher element 22 extends into engagement with the surface of the wall 10.

In order to impart rotative movement to the drum 8, I provide transmission mechanism which is best seen in Figures 3 and 4 of the drawings and is indicated generally at 27. The transmission mechanism 27 is carried within the housing 3 and includes a gear 28 which is mounted on the shaft 9. The gear 28 meshes with a pinion 29 which is carried on a stem 30, said stem having one end journaled in the end wall 4 and the other end journaled in an upright 31, said upright being mounted within the housing 3. The shaft 30 has fixed thereon a gear 32 and said gear 32 meshes with a pinion 33 which is mounted on a shaft 34, said shaft 34 being journaled at its inner end in an upright 35, the other end of said shaft being journaled in a plate 36, said plate 36 having one end pivoted to the outer end wall of the housing 3 by means of a pivot screw 37. The other end of the plate 36 is confined between studs 38 and 39 and is urged toward the stud 38 by means of a spring 40. Carried on the shaft 34 is a friction wheel 41 which is engageable with a friction driving wheel 42 which is carried on a motor shaft 43, said motor shaft being carried by a motor 44 which is mounted on the outer face of the end wall of the housing 3.

The frame 1 carries, beneath the stationary crusher element 22, an arcuate discharge wall 45, said wall being engageable by the elements 14 and 15 for guiding crushed insects to the slot 3 through which they will be dropped into a receptacle, such a container being filled with water or chemicals.

While it is believed that the operation of my invention will be understood from the foregoing, a brief description thereof is not thought to be out of place. My improved insect trap is first placed on a support above a receptacle of water or chemical and near an electric current outlet. In this connection, it is desired to state that, if preferred, legs may be mounted on the frame for supporting the device above a surface.

After the device has been made ready for use as above described, the motor is electrically connected to the outlet by means of a conventional power cord 46, with the result that the motor will be set in operation and the motor shaft 43 will be rotated for rotating the wheel 42. Rotation of the wheel 42 will communicate rotative movement to the wheel 41 with the result that such rotative movement will be communicated through the gears 33, 32, 29 and 28 to the shaft 9, for rotating the drum 8. Rotation of the drum 8 will be in clockwise direction.

If found desirable, suitable bait may be placed in the passage 21 for attracting flies or other insects into said pasasge. Flies in the passage will be engaged by the elements 14 and 15 and will be carried by said elements into engagement with the stationary crusher element 22, where they will be crushed and, as the drum rotates further, will be swept past said crusher element 22, upon movement of said crusher element, onto the wall 45 and thence to the slot 3, through which they will fall to the water receptacle beneath. It should be understood that the pressure elements 14 and 15 selectively engage the stationary crusher element 22 and that, when either said crusher element 14 or said crusher element 15 engages the stationary element, said element 14 or element 15 will be swung backwardly toward the buffer elements 12 and 13, respectively, so that said buffer elements will prevent too quick a return of the element 22 to normal position. Swinging movement of the stationary crusher element 22 will be against the tension of the spring 26 so that, when the element 14 or the element 15 has cleared the element 22, said spring 26 will return said element 22 to the normal position shown in Figure 2.

Attention is directed to the fact that, inasmuch as the shaft 34 has one end mounted in the plate 36, and said plate is urged upwardly by the spring 40, the wheel 41 will be kept in constant frictional engagement with the wheel 42.

It is further desired to point out that my improved insect trap is quiet and highly efficient in operation. Moreover, it is desired to mention that the device may be maintained in continuous operation over a long period of time at low cost.

Having thus described the invention, what is claimed as new is:

1. In an insect trap, a frame, a screen carried by the frame, a drum rotatable in the frame and cooperating with the screen to define a passage, a pair of crusher elements carried by the drum, means carried by the drum and hingedly and resiliently connecting the crusher elements with the drum, and a stationary crusher element carried by the frame in the passage for selective engagement by the first-mentioned crusher elements for crushing an insect upon rotation of the drum.

2. In an insect trap, a frame, a pair of end walls carried by the frame, a drum carried by the frame and rotatable between the end walls, buffer elements carried on the drum, crusher elements on the drum, said crusher elements being mounted forwardly of the buffer elements, means resiliently connecting the crusher elements with the drum, a stationary crusher element carried by the frame, a screen carried by the frame and cooperating with the drum for defining a passage, and a discharge wall mounted in the frame beneath the crusher element, said crusher elements being selectively engageable with the stationary crusher element for crushing an insect and said crusher elements being shiftable toward the buffer elements for sweeping crushed insects from the stationary crusher element toward the discharge wall upon rotation of the drum, said buffer elements assuring gradual return of the stationary crusher element to inoperative position.

3. In an insect trap, a frame, a screen carried by the frame, a drum rotatable in the frame and cooperaitng with the screen for defining a passage for insects, crusher elements carried by the drum, a spring extending diametrically of the drum and resiliently connecting the elements with the drum, a crusher element carried by the frame and selectively engageable with the first-mentioned crusher elements for crushing an insect within the passage, and means for hingedly mounting the stationary crusher element whereby said stationary crusher element may be swung for destroying a crushed insect upon rotation of the drum.

4. In an insect trap as recited in claim 3 including buffer elements on the drum for preventing too quick return of the stationary element to normal position.

JOSEPH H. JACKSON.